United States Patent

Clary et al.

[15] 3,645,820
[45] Feb. 29, 1972

[54] METHOD OF MAKING FLANGED-END TUBULAR ELEMENTS OF PLASTIC MATERIAL

[72] Inventors: Michael J. Clary, Canadaigua, N.Y.

[73] Assignee: Garlock Inc., Palmyra, N.Y.

[22] Filed: May 28, 1970

[21] Appl. No.: 41,261

[52] U.S. Cl. ............................. 156/191, 156/187, 156/294, 156/392
[51] Int. Cl. .................................................. B31c 1/00
[58] Field of Search .................. 156/184, 190, 191, 192, 187, 156/392, 430, 431, 293, 294

[56] References Cited

UNITED STATES PATENTS

| | | | |
|---|---|---|---|
| 2,644,651 | 7/1953 | Stahl et al. | 156/190 X |
| 2,756,003 | 7/1956 | Stahl | 242/118.8 |
| 2,755,821 | 7/1956 | Stahl | 242/118.32 |
| 3,388,932 | 6/1968 | Bradley | 285/288 |
| 2,907,103 | 10/1959 | Lewis et al. | 156/294 X |
| 2,958,906 | 11/1960 | Youthed | 156/294 X |
| 3,020,068 | 2/1962 | Costanzo | 156/294 X |
| 3,042,571 | 7/1962 | Jackson | 156/191 |
| 3,133,846 | 5/1964 | Gandy | 156/294 X |
| 3,363,918 | 1/1968 | Fisher | 156/192 X |
| 3,476,408 | 11/1969 | Wolfe | 156/294 X |

Primary Examiner—Carl D. Quarforth
Assistant Examiner—Gary G. Solyst
Attorney—Robert Henderson

[57] ABSTRACT

A flared-in central opening portion of an otherwise flat, plastic, flange element is disposed between and in overlapping relationship with edge portions of cylindrically wound plastic tape, whereafter, the overlapping portions of the tape and flange element are fused to unify them. The wound tape may have a thus associated flange element at either or both ends thereof.

3 Claims, 9 Drawing Figures

PATENTED FEB 29 1972 3,645,820

INVENTOR:
MICHAEL J. CLARY
BY Robert Henderson
ATTORNEY

METHOD OF MAKING FLANGED-END TUBULAR ELEMENTS OF PLASTIC MATERIAL

BACKGROUND OF THE INVENTION

Generally cylindrical connections for use in piping adapted for carrying corrosive fluids and linings for such connections are commonly formed of plastic material of noncorrosive character. One type of such a connection may have a body portion in noncorrugated cylindrical form for use where the interconnected piping sections are not subject to such temperature changes as could cause them to undergo material axial expansion and contraction. Another type of such a connection may have a generally cylindrical body portion which, however, is formed with one or more corrugations or arches to give it the character of a bellows and thereby render it useful as an expansion joint where such expansion and contraction may be encountered. Both of these types of connections commonly have sizable flanges at one or both ends for effecting connection to related piping.

A plastic material suitable for use for such noncorrosive connections is polytetrafluoroethylene (sometimes referred to hereinafter for convenience as PTFE). Other noncorrosive plastic material may be used instead of PTFE and the use herein of the term "noncorrosive plastic material" shall be understood to comprehend all noncorrosive plastic material which may be processed and utilized as herein described.

In piping arrangements wherein the fluid to be carried has little or no corrosion potential, PTFE or the like may, of course, be used for the connections; but, in such latter piping arrangements the plastic material used need not necessarily have the corrosion resistant character of PTFE or the like. Thus, reference herein merely to "plastic material" should be understood to comprehend all plastic material, irrespective of corrosion resistance characteristics, which may be utilized as herein described.

Flanged-end tubular elements of plastic material such as PTFE, for example, have hitherto been formed by machining sintered tubular or solid rod stock to the desired tubular shape and dimensions, including an end flange or flanges. Such methods, however, are wasteful of both time and material.

Tubular elements of plastic material have also hitherto been formed by extrusion, whereafter a radial flange or flanges have been formed thereon by flaring the ends of the tube. The latter method, however, has been limited by the size of the extrusion equipment, and by the inability of flaring the tube's ends sufficiently to provide radially large enough flanges.

The stated difficulties have been overcome by the present invention.

THE ACCOMPANYING DRAWING

As illustrating a preferred form of this invention:

DETAILED DESCRIPTION

Although, as already indicated, a tubular element may be of suitable materials other than PTFE, it and its parts are described herein as formed of PTFE. The following description of a novel method of forming a flanged, tubular element of PTFE should serve also to disclose the characteristics of the finished tubular element.

Figure 1:
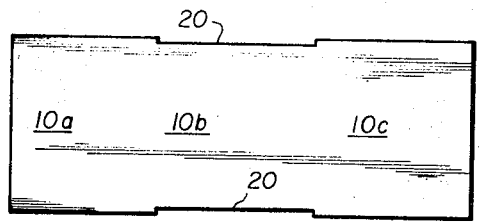
FIG. 1 is a plan view of a planar piece of plastic tape employed in making a tubular element according to this invention.
Figure 2:
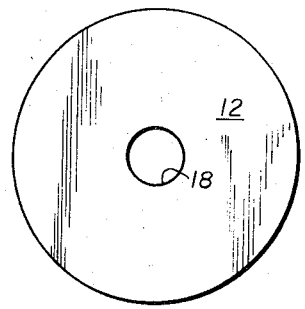
FIG. 2 is a plan view of a flat, annular, flange element.
Figure 3:
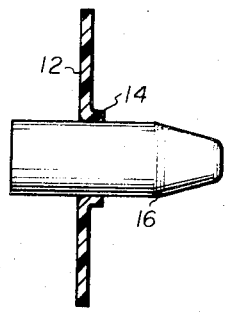
FIG. 3 is a central, sectional view of the flange element with its central opening flared in by a flaring tool.
Figure 4:
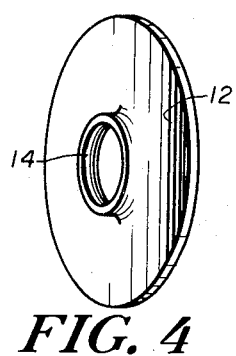
FIG. 4 is a side, perspective view of the flared flange element after withdrawal of the flaring tool therefrom.

A piece of tape or sheet material 10 of PTFE is formed to the shape shown in FIG. 1, and two flat discs 12 of PTFE are formed with circular inner flanges 14 by pushing a flaring tool 16 into central openings 18 of said discs.

Figure 5:
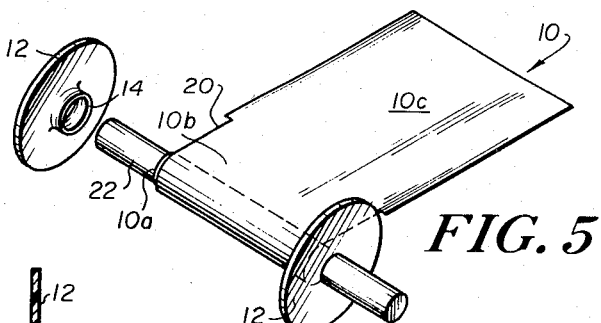
FIG. 5 is a perspective view of said tape during winding thereof into tubular from upon a mandrel; end flange elements being shown in the process of being applied to opposite ends of the developing tube.

The tape 10, is formed with opposed, side indentations 20 toward one end thereof which subdivide the tape 10 into a short end portion 10a, a narrower but slightly longer intermediate portion 10b, and an opposite end portion 10c which is slightly longer than portion 10b. The tape is wound upon a steel mandrel 22 (FIG. 5), preferably coated with silicone oil, the tape's short end portion 10a, being applied to the mandrel as commencement of the winding. The winding operation progresses until the winding includes most of the tape's immediate portion 10b.

Then, the two discs 12 are slid onto opposite ends of the mandrel with their flanges 14 facing inwardly, said flanges and the tape and mandrel being so related in dimensions that said flanges will snugly overlie marginal areas of the tape's portion 10a which, is in wound form on the mandrel, and will abut the wound part of the tape's portion 10b. Thereafter, the remainder of the tape 10 is wound upon the mandrel so that the flanges 14 are embraced within marginal areas of the tape's portion 10c.

Upon completion of the winding of the plastic tape 10, metal, supporting discs 24 are slid onto the opposite ends of the mandrel 22 into firm supporting engagement with the discs 12 and are held in such supporting engagement by any suitable means (not shown). Also, a winding of glass fiber tape 26 is applied over the entire length of the cylindrically wound plastic tape 10, preferably to the extent of two or more layers. At this stage of operation, the flanged-end tubular element of plastic is adequately supported both internally and externally in preparation for a following sintering treatment.

At this point, it should be noted that advantage can be taken of a characteristic of PTFE; that it shrinks when sintered and that the rate of shrinkage depends largely upon the type of resin used and the method of processing, factors known in the art quite apart from the present invention. It has been found, however, that PTFE may undesirably crack at an excessive shrinkage rate. Practice of this invention preferably involves selection and use of PTFE of a lower shrinkage rate, which enables the PTFE tape 10 to shrink sufficiently upon sintering, that the layers thereof will tighten upon underlying layers to cause bonding therebetween.

After the described preparation of the assembly of the flanged-end tubular element, the mandrel, the glass fiber tape winding, and the metal end plates, that assembly is sintered for about 1 hour at a temperature of 720° F. This sintering causes partial fusion of the layers of the wound PTFE tape 10 with each other and of marginal areas of said tape with the flanges 14 of the discs 12.

Figure 6:
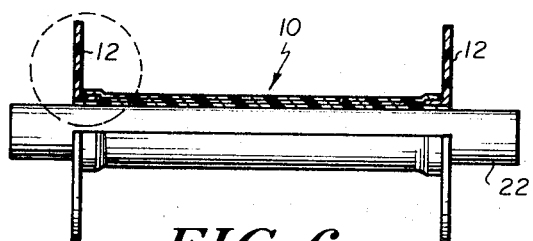
FIG. 6 is a view of the assembled tube and flanges; the upper half being shown in central, longitudinal section, and the lower half being shown in elevation.
Figure 7:
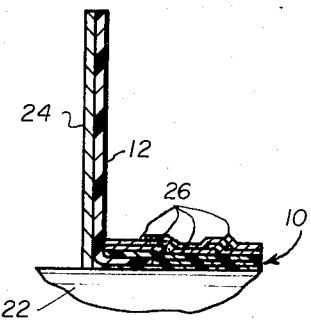
FIG. 7 is an enlarged view of the chain line circled portion of FIG. 6, with the addition of a metal end plate and a glass fiber tape winding which are employed for support purposes during sintering of the flanged tube.

Upon completion of the described sintering operation, the glass fiber tape 26 and the metal supporting discs 24 are removed and the mandrel 22 is withdrawn from the PTFE parts, leaving a bodily integral, flanged-end, tubular element of PTFE differing from the PTFE parts shown in FIG. 6 only in that said parts are fused to each other as a result of the sintering. This tubular element, per se, is suitable for use as a mere connection between members of related piping where it need not compensate for expansion and contraction of the piping. It is not suitable, however, as an expansion joint.

Figure 8:
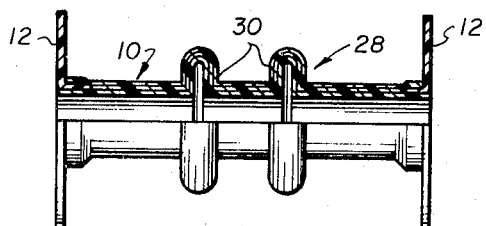
FIG. 8 is a longitudinal view of a flanged expansion joint formed from a flanged tubular element, according to this invention, made entirely of plastic material; the upper half being in section and the lower half being in elevation.

The PTFE element, after the described sintering and the removal therefrom of the glass fiber tape 26, the supporting discs 24, and the mandrel 22, may be converted into a Teflon expansion joint 28 as illustrated in FIG. 8, by forming one or more corrugations 30 therein (two being shown) to give it the form of a bellows. The manner of doing this, by the use of heat and pressure, is known in the art and, therefore, is not described herein.

Figure 9:
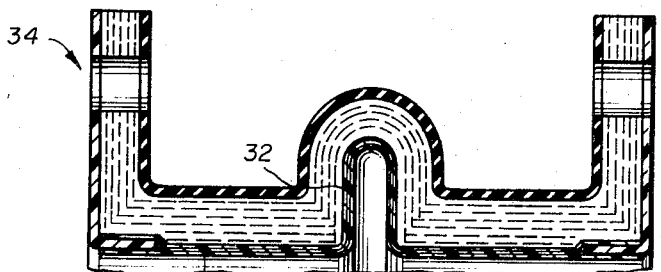
FIG. 9 is a partial longitudinal view of a flanged expansion joint wherein a flanged tubular element according to this invention is employed as a lining of an expansion joint having a carcass consisting largely of rubber impregnated fabric.

FIG. 9 shows a PTFE element constituting an expansion joint lining 31 differing from the complete expansion joint 28 of FIG. 8 chiefly in having only a single corrugation or arch 32 therein. This lining is shown as employed in an expansion joint 34 having a carcass formed largely of layers of rubber impregnated fabric. The latter type of expansion joint usually has reinforcing means incorporated therein, but such reinforcing means are not illustrated as they are not a part of the present invention.

I claim:

1. A method of making a flanged-end tubular element of plastic material comprising the steps of:
   a. Forming a sheet of plastic material into generally rectangular shape with opposed sides having indentations intermediate the ends of said sheet thus forming intermediate and marginal area end portions, and forming a generally flat, annular disc of plastic material with a circular, inner, axially extending flange;
   b. Winding said sheet endwisely upon a mandrel until one end portion of the sheet and an intermediate portion thereof between said indentations have been applied to the mandrel;
   c. Moving said disc endwisely of the mandrel with its said flange facing inwardly to cause said flange to overlap marginal areas of the wound one end portion of the sheet and to abut the wound intermediate portion of the sheet;
   d. Winding the remainder of said sheet to cause marginal areas of said remainder to overlap said flange; and
   e. Sintering the thus assembled wound sheet material and flanged disc to cause the overlapping portions thereof to become fused together.

2. A method according to claim 1 wherein two of said flanged discs are formed and similarly moved into said overlapping and abutting relationship with said sheet at opposite ends of the latter, whereafter the thus assembled wound sheet material and discs are sintered to fuse them together.

3. A method according to claim 2, wherein, prior to said sintering step, relatively rigid, flat discs of nonplastic material are applied against faces of the plastic discs and glass fiber tape is wound about the wound sheet material to support the latter and said discs during the sintering step.

* * * * *